(12) United States Patent
Qin

(10) Patent No.: US 12,499,086 B2
(45) Date of Patent: Dec. 16, 2025

(54) INFORMATION PROCESSING METHOD AND APPARATUS

(71) Applicant: Huawei Technologies Co., Ltd., Shenzhen (CN)

(72) Inventor: Lidu Qin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/598,632

(22) Filed: Mar. 7, 2024

(65) Prior Publication Data

US 2024/0211435 A1 Jun. 27, 2024

Related U.S. Application Data

(63) Continuation of application No. PCT/CN2022/115503, filed on Aug. 29, 2022.

(30) Foreign Application Priority Data

Sep. 8, 2021 (CN) .......................... 202111051925.5

(51) Int. Cl.
*G06F 16/00* (2019.01)
*G06F 16/13* (2019.01)
*G06F 16/14* (2019.01)

(52) U.S. Cl.
CPC .............. *G06F 16/13* (2019.01); *G06F 16/14* (2019.01)

(58) Field of Classification Search
CPC ................................ G06F 16/13; G06F 16/14

USPC ................................................ 707/600–899
See application file for complete search history.

(56) References Cited

U.S. PATENT DOCUMENTS

| 7,120,631 | B1 * | 10/2006 | Vahalia | G06F 16/1774 |
| 7,599,941 | B2 * | 10/2009 | Bahar | H04L 67/1001 |
| 8,296,420 | B2 * | 10/2012 | Wujuan | G06F 16/1827 |
| | | | | 709/224 |
| 10,887,429 | B1 * | 1/2021 | Kirsch | H04L 67/1097 |
| 2010/0281133 | A1 * | 11/2010 | Brendel | G06F 16/13 |
| | | | | 709/213 |
| 2017/0097941 | A1 * | 4/2017 | Graves, Jr. | H04L 69/40 |
| 2020/0045101 | A1 * | 2/2020 | Dolby | G06F 16/00 |
| 2024/0385989 | A1 * | 11/2024 | Joseph | G06F 16/122 |

FOREIGN PATENT DOCUMENTS

| CN | 101051290 A | 10/2007 |
| CN | 105589506 A | 5/2016 |

* cited by examiner

*Primary Examiner* — Michelle N Owyang
(74) *Attorney, Agent, or Firm* — Slater Matsil, LLP

(57) ABSTRACT

A method includes: obtaining an access request, wherein the access request carries a first file path corresponding to to-be-accessed data, and the first file path comprises a preset root directory; determining, based on a path of the first file path in the preset root directory, a second file path in a first file system corresponding to the first file path, wherein a name space corresponding to the preset root directory comprises at least two types of sub-paths, and the at least two types of sub-paths respectively correspond to file paths in at least two different file systems; and determining a storage address of the to-be-accessed data based on the second file path.

19 Claims, 8 Drawing Sheets

INFORMATION PROCESSING METHOD AND APPARATUS

CROSS-REFERENCE TO RELATED APPLICATIONS

This application is a continuation of International Application No. PCT/CN2022/115503, filed on Aug. 29, 2022, which claims priority to Chinese Patent Application Chinese Patent Application No. 202111051925.5, filed on Sep. 8, 2021. The disclosures of the aforementioned applications are hereby incorporated by reference in their entireties.

TECHNICAL FIELD

This application relates to the field of data storage, and in particular, to an information processing method and apparatus.

BACKGROUND

Currently, with development of information technologies, a scale of a data center used to store data increases.

In capacity expansion of the data center, a file system (FS) of a new expanded device and a file system of an old device may be independent of each other due to differences between vendors and models of the new device and that of the old device. In this case, data corresponding to a service needs to be migrated from an old file system to a new file system, so that the service can use the new file system. The entire migration process consumes a large amount of manpower and material resources.

SUMMARY

This application provides an information processing method and apparatus, to resolve a problem that capacity expansion is complex and management is difficult in a file system.

To achieve the foregoing objective, this application uses the following technical solutions.

According to a first aspect, an information processing method is provided. The method includes: obtaining an access request, where the access request carries a first file path corresponding to to-be-accessed data, and the first file path includes a preset root directory; and determining, based on a path of the first file path in the preset root directory, a second file path in a first file system corresponding to the first file path, where a name space corresponding to the preset root directory includes at least two types of sub-paths, and the at least two types of sub-paths respectively correspond to file paths in at least two different file systems. In the foregoing method, a global name space (that is, a name space corresponding to preset root directory) is constructed. All file paths in a plurality of file systems may be mapped to a unique file path in the global name space. In this way, a service side is decoupled from the file systems in a data center, to be specific, the service side uses the file path in the global name space to manage data, and the file systems in the data center are transparent to the service side. In this way, when there is a change in the file systems in the data center (for example, when a file system is added or reduced), only the file path in the file system and the file path in the global name space need to be modified, and the service side does not need to be modified accordingly. In addition, because the global name space may correspond to file paths of a plurality of file systems, one service may use the plurality of file systems, and therefore, configuration is more flexible.

In a possible design, the determining, based on a path of the first file path in the preset root directory, a second file path in a first file system corresponding to the first file path includes: determining the second file path of the to-be-accessed data in the first file system based on the path of the first file path in the preset root directory and a mount information table, where a correspondence between a file path in the name space corresponding to the preset root directory and a file path in a corresponding file system is recorded in the mount information table. In this design, the correspondence between the file path in the name space corresponding to the preset root directory and the file path in each file system may be pre-stored. In this way, by querying the mount information table, the file path in the file system corresponding to the first file path carried in the access request can be determined.

In a possible design, the method further includes: establishing a correspondence between a first subdirectory in the name space corresponding to the preset root directory and the first file system, where any path in the first subdirectory corresponds to the path in the first file system; and recording the correspondence between the first subdirectory and the first file system in the mount information table. In the foregoing design, different subdirectories in the name space corresponding to the preset root directory may correspond to different file systems, so that any path in the file system corresponds to a path that is the same as the foregoing path and that is in a subdirectory corresponding to the file system. For example, a file system 131a may correspond to a subdirectory "GNS:\fsA\" in a preset root directory "GNS:\", where any path in the file system 131a corresponds to a path in the subdirectory "GNS:\fsA\". For example, it is assumed that a file path of a piece of data in the file system 131a is "fsA:\path 1". In this case, it can be learned that in a name space corresponding to the preset root directory, a file path of the data is "GNS:\fsA\path 1". For another example, it is assumed that a file path of a piece of data in the file system 131a is "fsA:\path 2". In this case, it can be learned that in the name space corresponding to the preset root directory, a file path of the data is "GNS:\fsA\path 2". The rest may be deduced by analogy.

In a possible design, the determining a storage address corresponding to the to-be-accessed data based on the second file path includes: determining a first metadata node based on the second file path; sending an address request carrying the second file path to the first metadata node; and receiving the storage address that corresponds to the to-be-accessed data and that is sent by the first metadata node. In the foregoing design, the storage address corresponding to the to-be-accessed data can be determined and obtained, to complete read and write of the to-be-accessed data.

In a possible design, the method further includes: generating log information and updating a node information set when node information of a metadata node in the first file system changes, where the log information records changed content of the node information. In the foregoing design, when the node information of the metadata node in the first file system changes, the log information may be generated and the node information set may be updated. In this way, when the node information set fails to be updated, the node information set may be updated by triggering log rollback.

In a possible design, the at least two different file systems include at least two file systems of different types. In the foregoing design, the name space corresponding to the preset root directory may correspond to at least two file systems of different types, that is, file systems of different types may be accessed through different file paths in the preset root directory. In this way, for a service, different data may be stored in different file systems based on a use requirement, to use features of different file systems.

According to a second aspect, an information processing apparatus is provided. The information processing apparatus includes: an obtaining module, configured to obtain an access request, where the access request carries a first file path corresponding to to-be-accessed data, and the first file path includes a preset root directory; and a processing module, configured to determine, based on a path of the first file path in the preset root directory, a second file path in a first file system corresponding to the first file path, where a name space corresponding to the preset root directory includes at least two types of sub-paths, and the at least two types of sub-paths respectively correspond to file paths in at least two different file systems. The processing module is configured to determine a storage address of the to-be-accessed data based on the second file path.

In a possible design, that a processing module is configured to determine, based on a path of the first file path in the preset root directory, a second file path in a first file system corresponding to the first file path includes: The processing module is configured to determine the second file path of the to-be-accessed data in the first file system based on the path of the first file path in the preset root directory and a mount information table. A correspondence between a file path in the name space corresponding to the preset root directory and a file path in a corresponding file system is recorded in the mount information table.

In a possible design, the processing module is further configured to establish a correspondence between a first subdirectory in the name space corresponding to the preset root directory and the first file system, where any path in the first subdirectory corresponds to the path in the first file system. The processing module is further configured to record the correspondence between the first subdirectory and the first file system in the mount information table.

In a possible design, that the processing module is configured to determine a storage address corresponding to the to-be-accessed data based on the second file includes: The processing module is configured to determine a first metadata node based on the second file path; the processing module is configured to send an address request carrying the second file path to the first metadata node; and the processing module is configured to receive the storage address that corresponds to the to-be-accessed data and that is sent by the first metadata node.

In a possible design, the processing module is further configured to generate log information and update a node information set when node information of a metadata node in the first file system changes, where the log information records changed content of the node information.

In a possible design, the at least two different file systems include at least two file systems of different types.

According to a third aspect, a storage device is provided, including a processor and an interface. The processor receives or sends data through the interface, and the processor is configured to implement the method in the first aspect or the designs of the first aspect.

According to a fourth aspect, a file storage system is provided, including a routing device and a storage node. The routing device is configured to perform the method in the first aspect or the designs in the first aspect.

According to a fifth aspect, a routing device is provided, including a memory and a processor. The memory is configured to store computer instructions. The processor is configured to invoke the computer instructions from the memory and run the computer instructions, to implement the method in the first aspect or the designs of the first aspect.

According to a sixth aspect, a computer-readable storage medium is provided. The storage medium stores a computer program. When the computer program is executed by a processor, the method in the first aspect or the designs of the first aspect is implemented.

According to a seventh aspect, a computer program product is provided. The computer program product includes instructions. When the instructions are run on a processor, the method in the first aspect or the designs of the first aspect is implemented.

For beneficial effects of the second aspect to the seventh aspect, refer to beneficial effects of the first aspect and the designs in the first aspect. Details are not described herein again.

DETAILED DESCRIPTION OF ILLUSTRATIVE EMBODIMENTS

The following describes technical solutions in embodiments with reference to accompanying drawings in embodiments. To clearly describe the technical solutions in embodiments, terms such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In addition, in embodiments, words such as "example" or "for example" are used to give an example, an illustration, or a description. Any embodiment or design scheme described as an "example" or "for example" in embodiments should not be explained as being more preferred or having more advantages than another embodiment or design scheme. Exactly, use of the word such as "example" or "for example" is intended to present a relative concept in a specific manner for ease of understanding.

For ease of understanding embodiments, related technologies in embodiments are first described.

Figure 1:
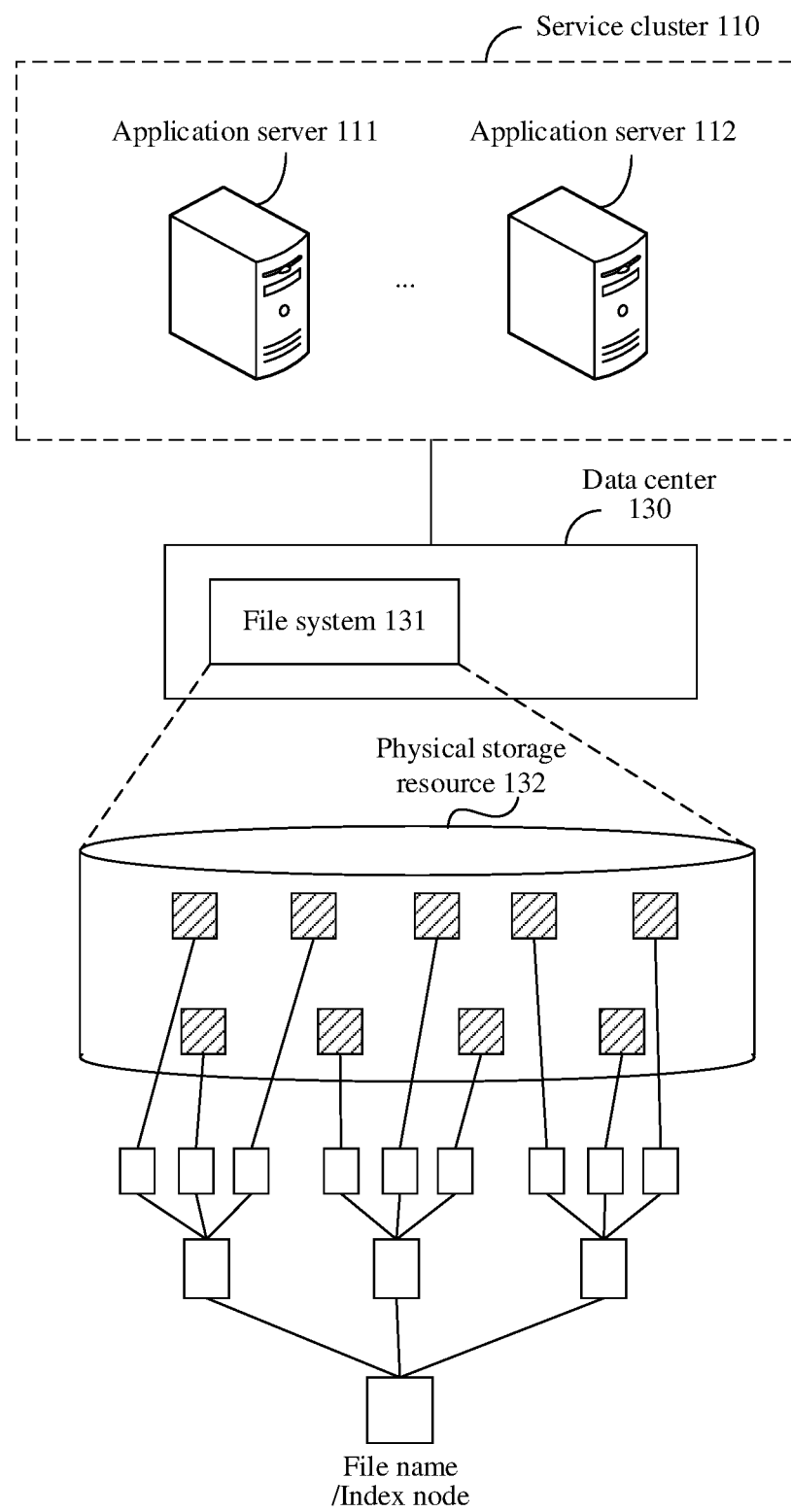
FIG. 1 is a schematic diagram 1 of an architecture of a storage system according to this application.

For example, FIG. 1 is a schematic diagram of an architecture of a storage system according to an embodiment. In the storage system shown in FIG. 1, a function of a corresponding service may be implemented by running an application in a service cluster 110. The service cluster 110 may include one or more computing devices, and the computing device may be an application server. For example, FIG. 1 shows two application servers, namely, an application server 111 and an application server 112. The application server may be a physical machine, or may be a virtual machine or a container. The application server includes but is not limited to a desktop computer, a server, a notebook computer, a mobile electronic device, and the like. An operating system run on the application server includes but is not limited to Windows, Linux, Android, and the like. It should be noted that, in FIG. 1, the computing device for implementing the service function is described in a form of the service cluster as an example. In actual application, the computing device configured to implement the service function may be a single computing device, and the service cluster may not be formed by a plurality of devices.

The application server may access a data center 130 through a switch (not shown in the figure) to read and write data. The switch is only an optional device. Alternatively, the application server may directly communicate with the data center 130 through a network. Alternatively, the switch may be replaced with an Ethernet switch, an InfiniBand switch, a RoCE (RDMA over Converged Ethernet) switch, or the like.

The data center 130 is configured to store data that needs to be stored in a service implementation process. Specifically, one or more storage devices in the data center form physical storage resources of the data center, and the physical storage resources are used to store data.

Specifically, all data in the physical storage resources is composed of 0 and 1. A series of 01 combinations stored in the physical storage resources cannot be distinguished and managed. Therefore, a concept of "file" may be used for organization of the data, to distinguish data for different purposes. In this case, different types of files are formed according to structures required by different applications. When there are a large number of files, the files can be grouped in a specific manner, and files of a same group are placed in a same directory (also referred to as a folder). In addition, besides files, a directory may include a lower-level directory (which may be referred to as a subdirectory or a subfolder). All files and directories form a tree structure. The tree structure is a file system.

For example, as shown in FIG. 1, the data center 130 includes a file system 131 configured to manage data in a physical storage resource 132. The file system 131 includes a tree structure used for structured management and storage of the data in the physical storage resource 132. The physical storage resource 132 may include one or more storage devices (not shown in the figure) for data storage.

In a file system, to facilitate data search, from a root directory to names of a directory, a subdirectory, and a file are combinations of special characters (for example, "\" in a Windows\ DOS operating system and "\" in a Unix-like operating system), and a string of characters is referred to as a file path, for example, \etc\systemd\system.conf in Linux or C:\Windows\System32\taskmgr.exe in Windows. A path is a unique identifier for accessing a specific file. For example, D:\data \file.exe in Windows is a path of a file, which indicates the file.exe file in a data directory in partition D.

File systems are classified into centralized file systems and distributed file systems (distributed file system, DFS) based on different locations of physical storage resources managed by the file systems.

The centralized file system may be understood as a file system in which a physical storage resource managed by the file system is located on a local node (that is, a node belongs to the file system).

The distributed file system may be understood as a file system in which a physical storage resource managed by the file system may not be directly connected to a local node but connected to the local node through a computer network, or the distributed file system may be understood as a complete hierarchical file system formed by combining several different logical disk partitions or volume labels.

For example, in FIG. 1, compared with the service cluster 110, the file system 131 may be understood as a distributed file system. The application server in the service cluster 110 may be connected to the file system 131 through a communication interface (which may also be understood as a client of the file system 131) for data access.

The distributed file system provides a logical tree file system structure for resources distributed anywhere on a network, making it easier for a user to access shared files distributed on the network. The distributed file system adopts a client\server architecture. Data is stored on a server side, and a client application can access a file on a remote server as the client application accesses a local file system. Usually, file data is cached on a client to improve read and write performance and system scalability. Based on different file access protocols, common distributed file systems (DFSs) include a network file system (NFS), a universal internet file system (common internet file system, CIFS), a Lustre file system, a BeeGFS file system, and the like.

Further, as an amount of data stored in the data center increases, a storage device (that is, a physical storage resource) needs to be added to expand a capacity of the data center. However, because a new storage device and an old storage device may use different file systems, there may be a plurality of mutually independent file systems in the data center. As a result, inconvenience in operation and maintenance of the data center are caused.

For example, it is assumed that the data center 130 originally includes a file system 131a, and the file system 131a stores data of two services (referred to as a service A and a service B). In this case, both the service A and the service B manage data corresponding to the services by accessing the file system 131a. Then, after the capacity of the data center 130 is expanded, as shown in (a) in FIG. 2, the data center 130 further includes a file system 131b configured to manage an added physical storage resource. In this case, the data center 130 includes two mutually independent file systems, that is, a file system 131a and a file system 131b.

After a capacity of the file system 131b of the data center 130 is expanded, to enable a service in the data center 130 to use a physical storage resource managed by the file system 131b, all data corresponding to one or more services in the data center 130 needs to be migrated to the file system 131b (which may also be understood as migration of all data to the physical storage resource managed by the file system 131b), and the file system 131b is configured for the migrated service. Specifically, the following describes two possible implementations by using examples.

In a first implementation, a manner in which different services use different file systems may be used. Specifically, as shown in (b) in FIG. 2, a manner in which the service A is configured to use the file system 131a and the service B is configured to use the file system 131b may be used, to achieve an objective that the two file systems respectively provide businesses for the service A and the service B in the service cluster. For example, for data corresponding to the service A, a root directory "fsA:\" corresponding to the file system 131a is used as a root directory of a file path; and for data corresponding to the service B, a root directory "fsB:\" corresponding to the file system 131b is used as a root directory of a file path.

In this implementation, the data of the service B needs to be migrated from the physical storage resource managed by the file system 131a to the physical storage resource managed by the file system 131b, and the file system 131b needs to be configured for the service B. Therefore, on the one hand, because data corresponding to services in the file system is usually distributed in a complex manner, the foregoing migration process is very complex and long. In this process, various problems such as device replacement, early-stage investment protection, and service switchover need to be considered. On the other hand, because a file system used by the migrated service changes, modification needs to be made accordingly on the service cluster side to adapt to the new file system. In the foregoing design, capacity expansion is difficult and an operation process is complex.

In a second implementation, a manner of migrating all data corresponding to an old file system to a new file system may be used. Specifically, as shown in (c) in FIG. 2, all data corresponding to the service A and the service B may be migrated from the physical storage resource managed by the file system 131a to the physical storage resource managed by the file system 131b. In this case, the service A and the service B may use the file system 131b in a manner of using the file system 131a. Therefore, a migration process is transparent to the service side, and the service side does not need to be changed.

It can be learned that, in this implementation, there are problems of heavy workload and a long migration period in the entire migration process. In addition, in this implementation, additional software and hardware need to be occupied during data migration, so that a data migration engine is used to complete migration.

Problems in operation and maintenance of the data center are caused because there are a plurality of file systems in the data center. To avoid the problems, in embodiments, a global name space may be constructed for the plurality of file systems in one data center. All file paths in the plurality of file systems may be mapped to a unique file path in the global name space. For example, a data center includes two file systems. Root directories of the two file systems are "fsA:\" and "fsB:\" respectively, and a root directory of a global name space is "GNS:\". The file paths "fsA:\" and "fsB:\" in the two file systems may be mapped to file paths "GNS:\fsA" and "GNS:\fsB" of the global name space respectively. In this way, a service side (for example, the application server in the service cluster) may use the file path in the global name space to manage data. When data is to be accessed, a file system corresponding to the accessed data and a file path in the file system may be first determined based on a file path of the accessed data in the global name space. A storage address of the accessed data is determined based on the file path in the file system, so that a read/write operation of the accessed data is completed. In the foregoing manner of constructing the global name space, the service side may be decoupled from the file systems in the data center, to be specific, the service side uses the file path in the global name space to manage data, and the file systems in the data center are transparent to the service side. In this way, when there is a change in the file systems in the data center (for example, when a file system is added or reduced), only the file path in the file system and the file path in the global name space need to be modified, and the service side does not need to be modified accordingly. In addition, because the global name space may correspond to file paths of a plurality of file systems, one service may use the plurality of file systems, and therefore, configuration is more flexible.

Figure 3:
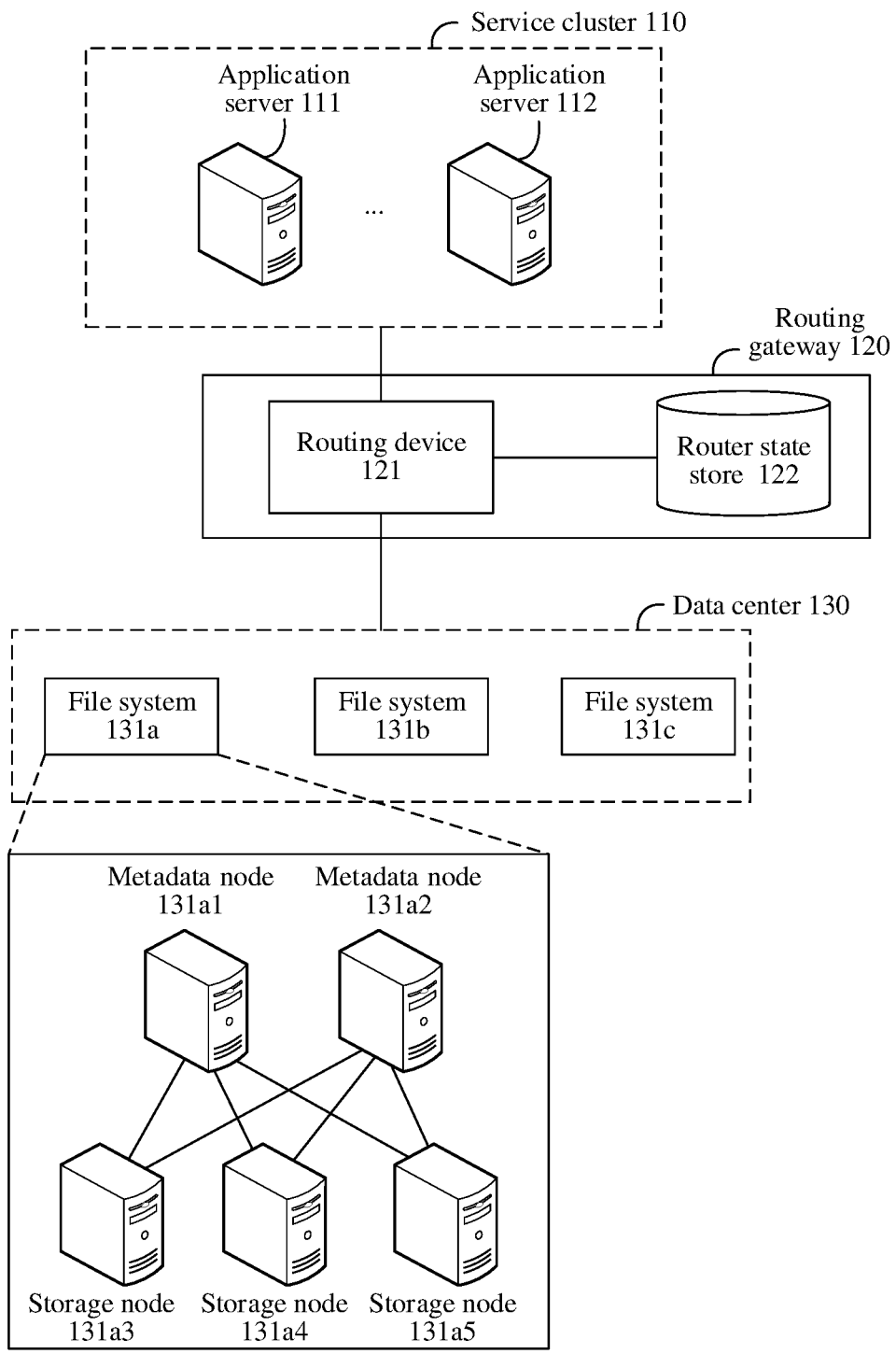
FIG. 3 is a schematic diagram 2 of an architecture of a storage system according to this application.

The following describes the technical solution provided in this embodiment with reference to an example. FIG. 3 is a schematic diagram of an architecture of a storage system to which a technical solution provided in this embodiment is applied.

The storage system includes a service cluster 110 configured to implement a service function and a data center 130 configured to store data. The service cluster 110 may include one or more application servers. For example, the service cluster 110 in FIG. 3 includes an application server 111 and an application server 112. The data center 130 includes a plurality of file systems configured to manage different physical storage resources. As shown in FIG. 3, the data center 130 includes a file system 131a, a file system 131b, and a file system 131c.

Each of the file systems included in the data center 130 may correspond to one or more storage devices, and form a physical storage resource managed by the file system. The file system 131a in FIG. 3 is used as an example. The file system 131a may include one or more metadata nodes (for example, a metadata node 131a1 and a metadata node 131a2 in FIG. 3) and one or more storage nodes (for example, a storage node 131a3, a storage node 131a4, and a storage node 131a5 in FIG. 3). The storage node is configured to store corresponding data for implementing a service function (to distinguish metadata, data for implementing a service function is referred to as service data in the following). The metadata node is configured to store metadata of service data, for example, a storage address of the service data in the storage node.

Figure 2:
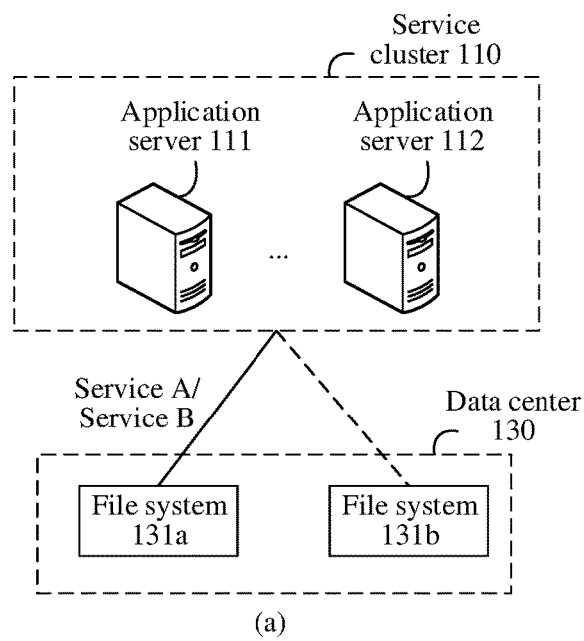
FIG. 2 is a schematic diagram of a storage system expansion method according to this application.
Figure 2:
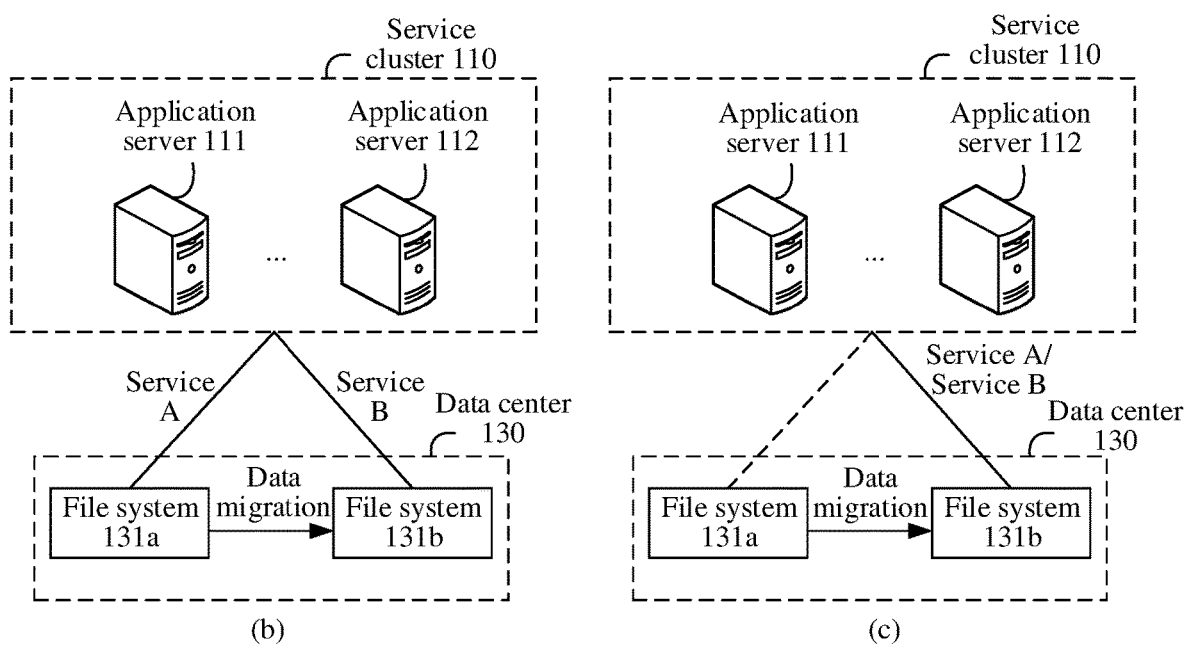

In addition, for other descriptions of the service cluster 110 and the data center 130 in FIG. 3, refer to the foregoing corresponding descriptions of the service cluster 110 and the data center 130 in FIG. 1 and FIG. 2. Details are not described herein again.

In addition, the storage system further includes a routing gateway 120. The routing gateway 120 is configured to provide a file access interface for the service cluster 110. When an access request from the service cluster is received, a file system corresponding to to-be-accessed data and a file path in the file system are determined based on a file path that is of a global name space and that is carried in the access request, and the file system is accessed according to the file path in the file system. The routing gateway 120 may specifically include a routing device 121 configured to implement the foregoing functions, and a router state store 122 configured to store data required for implementing the foregoing functions. For example, the router state store 122 may store a correspondence between the file path in the global name space and the file path in the file system, working status information of the routing device 121, and the like. The router state store 122 may be located inside the routing device 121, or the router state store 122 may be independent of the routing device 121 and stored in another device. This is not limited in this embodiment.

In addition, in an actual application process, in an implementation, the functions of the routing gateway 120 may be implemented by a hardware device independent of all file systems in the data center. In another implementation, the routing gateway 120 may be located in the file system in the data center, and the functions of the routing gateway 120 may be implemented by some software/hardware apparatuses in the file system in the data center. In this embodiment, a location of a device to which the routing gateway 120 belongs in the storage system may not be limited.

Figure 4:
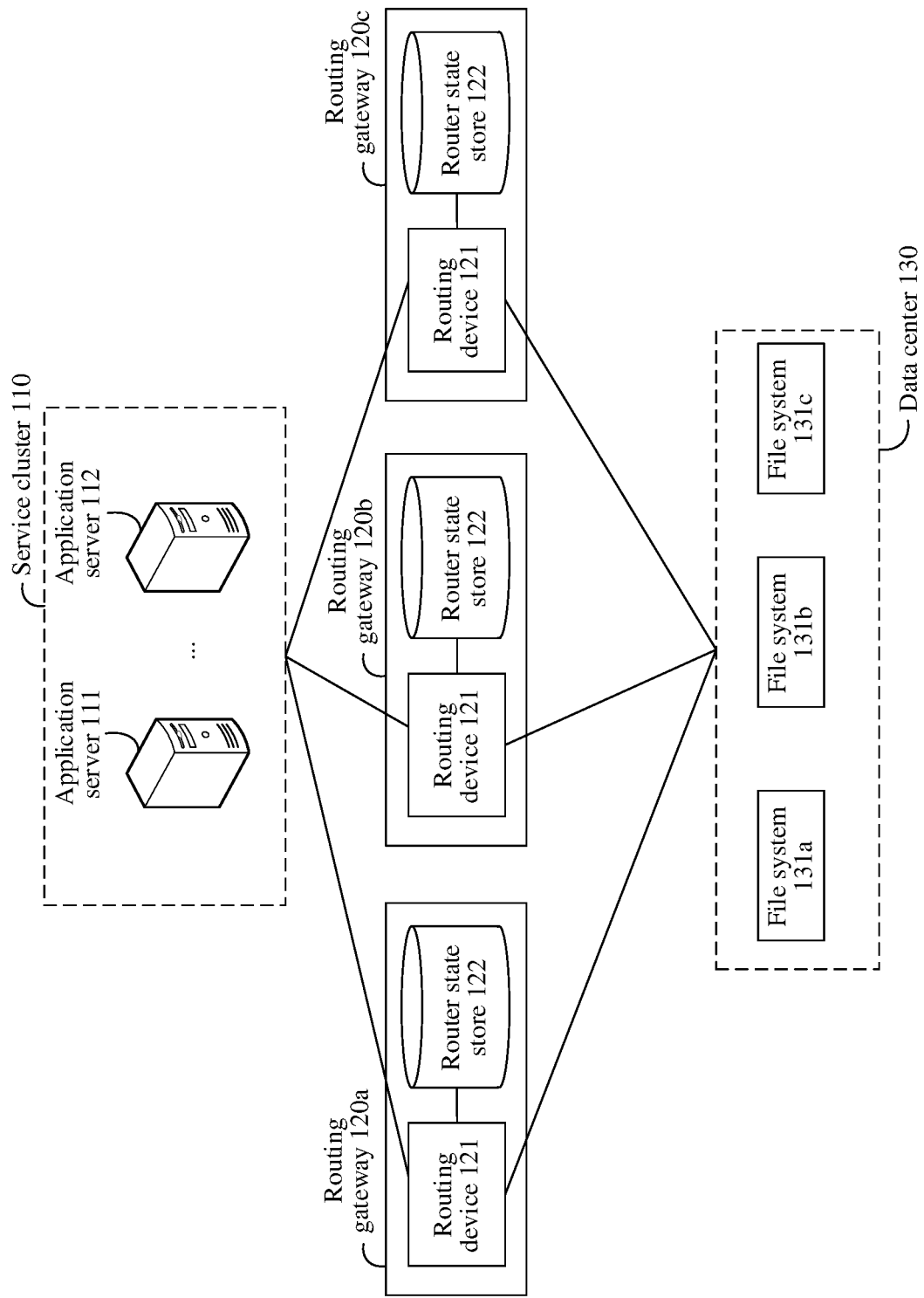
FIG. 4 is a schematic diagram 3 of an architecture of a storage system according to this application.

In addition, it should be noted that, in an actual application, a storage system may further include a plurality of routing gateways. For example, as shown in FIG. 4, a storage system includes a routing gateway 120a, a routing gateway 120b, and a routing gateway 120c. The plurality of routing gateways are located on different nodes in the storage system. The plurality of routing gateways are in a primary-secondary relationship, that is, the plurality of routing gateways include at least one primary routing gateway and at least one secondary routing gateway. When a read operation or a write operation is performed on data stored in the data center 130, a service cluster 110 may preferentially send an access request to a primary routing gateway, so as to implement data access. When anomalies such as a fault or overload occurs on the primary routing gateway, the access request may be sent to a secondary routing gateway, so as to implement data access. This improves system reliability.

The following uses the storage system in FIG. 3 as an example to describe in detail the technical solution provided in this embodiment. It should be noted that, when there are a plurality of routing gateways in the storage system, the following technical solution of this embodiment is also applicable. This is not limited in this embodiment.

Figure 5A:
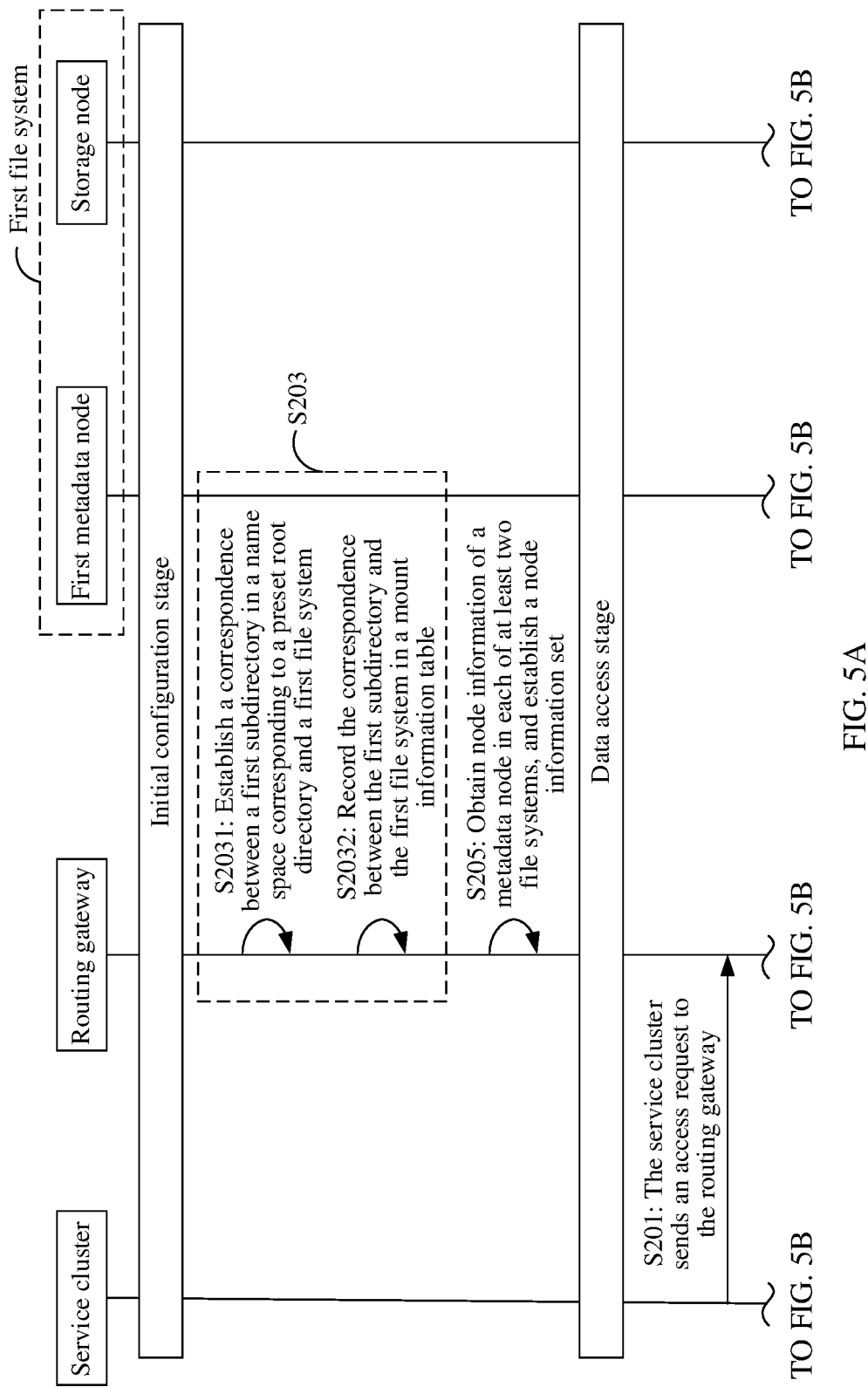
FIG. 5A and FIG. 5B are a schematic flowchart of information processing method according to this application.
Figure 5B:
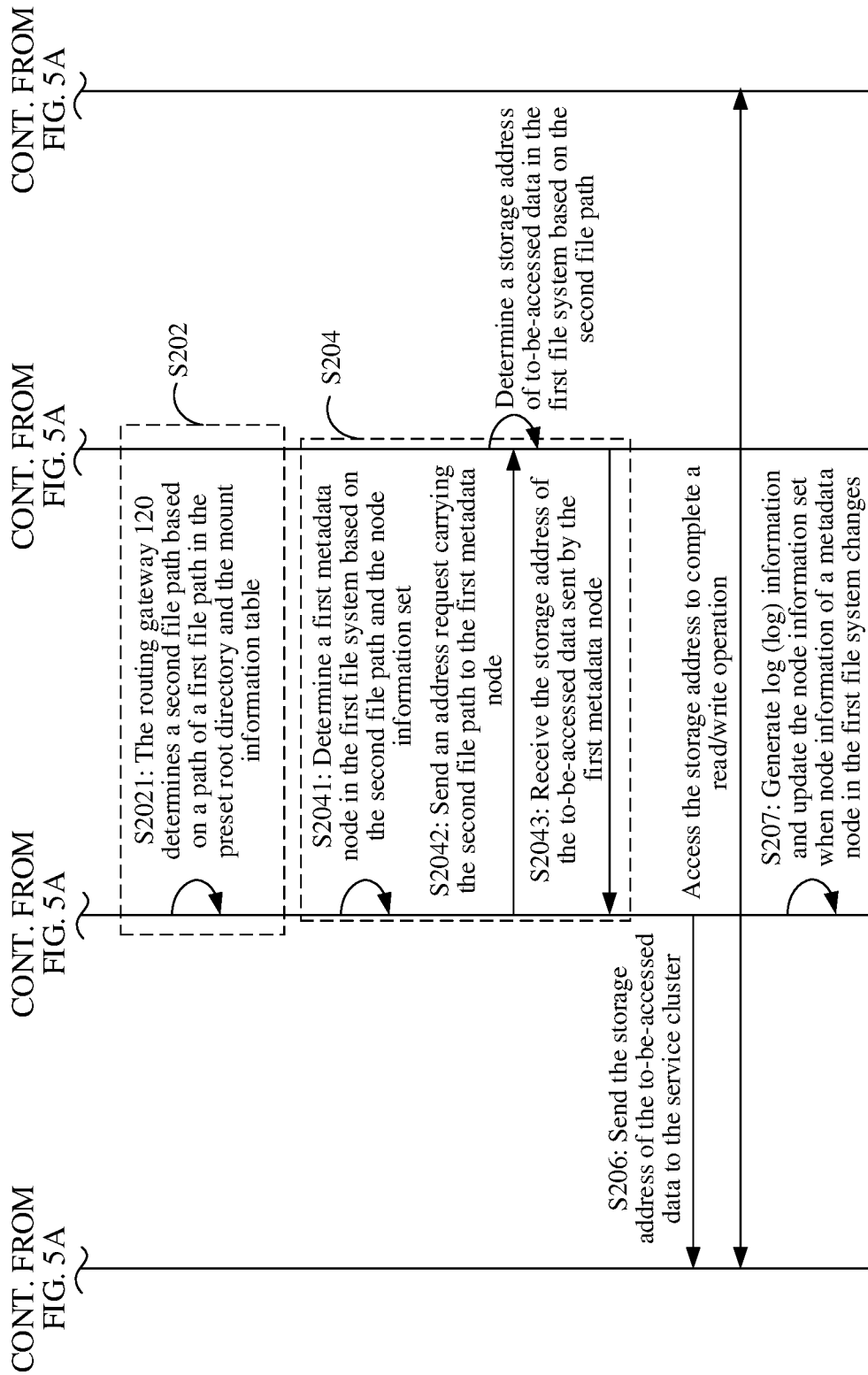

Specifically, in a running process of the service cluster 110, for a scenario in which the service cluster 110 writes data (referred to as to-be-accessed data below) into or reads data from the data center 130, this embodiment provides an information processing method. As shown in FIG. 5A and FIG. 5B, the method includes the following steps.

S201: The service cluster 110 sends an access request to the routing gateway 120.

The access request carries a first file path corresponding to the to-be-accessed data. The first file path includes a root directory that is preset (referred to as a preset root directory for short below).

For example, the access request may be a remote procedure call (RPC) request.

In an actual implementation, the routing gateway 120 may be understood as any device that can implement functions implemented by the routing gateway 120 in this embodiment. Specifically, in an application process, the routing gateway 120 may also be referred to as "router", "routing device", or the like. It is easy to understand that a specific name of the routing gateway is not limited in this embodiment.

S202: After the routing gateway 120 obtains the access request, the routing gateway 120 determines, based on a path of the first file path in the preset root directory, a second file path in a first file system corresponding to the first file path.

Specifically, a name space corresponding to the preset root directory may include at least two types of sub-paths. The at least two types of sub-paths respectively correspond to file paths in at least two different file systems. That is, a path in the name space corresponding to the preset root directory may be mapped to a file path in one of the at least two file systems.

In other words, in this embodiment, a global name space (that is, the name space corresponding to the preset root directory) is constructed, and file paths in the plurality of file systems included in the data center are mapped to a unique file path in the global name space. For example, the data center 130 in FIG. 3 includes three file systems. Root directories of the file systems 131a, the file system 131b, and a file system 131c are respectively "fsA:\", "fsB:\", and "fsC:\". A preset root directory of the global name space is "GNS:\".

Then, when the service cluster 110 writes the to-be-accessed data into or reads the to-be-accessed data from the data center 130, after obtaining the first file path that is sent by the service cluster 110 and that carries the preset root directory (in other words, the first file path is the file path in the global name space), the routing gateway 120 can determine, based on the path of the first file path in the preset root directory, a file path (that is, the second file path) in the first file system corresponding to the first file path.

For example, it is assumed that one piece of service data is stored in the file system 131a, a file path of the service data in the file system 131a is "fsA:\ Windows \System32\taskmgr.exe", and a mapping file path of the file path "fsA:\ Windows\System32\taskmgr.exe" in the file system 131a in the preset root directory "GNS:\" is "GNS:\fsA\ Windows \System32\taskmgr.exe". In this case, when the service cluster 110 is to access the service data, the service cluster 110 may send, to the routing gateway 120, an access request carrying the file path "GNS:\fsA \ Windows \System32\taskmgr.exe" (that is, the first file path in S202), and then the routing gateway 120 may determine the file path "fsA:\Windows \System32\taskmgr.exe" (that is, the first file path in S202) in the file system 131a based on the file path "GNS:\fsA\ Windows\System32\taskmgr.exe", to access the file system 131a via the file path "fsA:\ Windows\System32\taskmgr.exe" and complete a read and/ or write operation on service data.

It should be noted that the access request obtained by the routing gateway 120 in S202 may be directly sent by the service cluster 110 to the routing gateway 120 in S201, or may be generated inside the routing gateway 120. For example, the access request obtained by the routing gateway 120 in S202 may be any internal instruction of the routing gateway 120 that is generated after the routing gateway 120 receives the access request sent by the service cluster 110 and that is used to trigger execution of S202. This is not limited in this embodiment.

In an implementation, in this embodiment, at least two file systems respectively corresponding to at least two types of paths included in the name space corresponding to the preset root directory specifically include file systems of different types.

File systems of different types may include file systems with different file access manners, different communication protocols, different types of used storage media, or the like. For example, the at least two file systems include an NFS file system and a Lustre file system, which are file systems of two types.

In the foregoing implementation, the name space corresponding to the preset root directory may correspond to at least two file systems of different types. In other words, different file systems may be accessed by sending different access requests including different file paths in the preset root directory to the routing gateway. In this way, for a service, different data may be stored in different file systems based on a use requirement, to use features of different file systems.

In an implementation, the routing gateway 120 may pre-store correspondences between file paths in the name space corresponding to the preset root directory and file paths of all file systems. For ease of description, the correspondences are referred to as a mount information table below. In this way, after receiving the access request, the routing gateway 120 may determine, by querying the mount information table, the file path in the file system corresponding to the first file path carried in the access request. Therefore, S202 may specifically include:

S2021: The routing gateway 120 determines, based on the path of the first file path in the preset root directory and the mount information table, the second file path in the first file system corresponding to the first file path.

A correspondence between a file path in the name space corresponding to the preset root directory and a file path in a corresponding file system is recorded in the mount information table.

Further, in an implementation, as shown in FIG. 5A, before S202 is performed, the method further includes:

S203: The routing gateway 120 establishes a mount information table.

Specifically, when the routing gateway 120 includes the routing device 121 and the router state store 122, the mount information table may be stored in the router state store 122. After obtaining the access request, the routing device 121 can determine the second file path in the first file system by accessing the mount information table stored in the router state store 122.

For example, Table 1 shows an example of the mount information table.

TABLE 1

| File path in a global name space | File path in a file system |
|---|---|
| GNS:\fsA\Windows\System32\taskmgr.exe | fsA:\Windows\System32\taskmgr.exe |
| GNS:\fsA\Program Files (x86)\Windows Photo Viewer\zh-CN | fsA:\Program Files (x86)\Windows Photo Viewer\zh-CN |
| GNS:\fsA\Windows\debug\WIA | fsA:\Windows\debug\WIA |
| . . . | . . . |
| GNS:\fsB\Users\Public\Pictures | fsB:\Users\Public\Pictures |
| GNS:\fsB\tmpbdd\patch\W1064 | fsB:\tmpbdd\patch\W1064 |
| . . . | . . . |
| GNS:\fsC\Program Files\Windows NT\TableTextService\en-US | fsC:\Program Files\Windows NT\TableTextService\en-US |
| GNS:\fsC\Program Files\GoogleChrome\Application\92.0.4515.159 | fsC:\Program Files\Google\Chrome\Application\92.0.4515.159 |
| . . . | . . . |

The column "file path in a global name space" records various file paths in the name space corresponding to the preset root directory (that is, GNS:\), and the column "file path in a file system" records file paths in file systems corresponding to the various file paths in the name space corresponding to the preset root directory (that is, GNS:\). Further, when receiving the access request carrying the first file path, the routing gateway 120 may search the column "file path in a global name space" in Table 1 for the first file path, to find a file path in a file system corresponding to the first file path.

It should be noted that Table 1 merely describes, by using a list as an example, correspondences that may be recorded in the mount information table. In actual application, the mount information table may also be stored in another storage manner. For example, the mount information table may be stored in a structured storage manner, for example, a tree structure.

In a possible design, in this embodiment, different subdirectories in the name space corresponding to the preset root directory may correspond to different file systems, so that any path in the file system corresponds to a path that is the same as the foregoing path and that is in a subdirectory corresponding to the file system.

It should be noted that, in this embodiment, for ease of understanding, a complete path starting from a root directory in a file system or a name space is referred to as a "file path", and a partial path in a directory (which may be a root directory or a subdirectory) in the file path is referred to as a "path". Similar cases in the following may be understood in the same way unless otherwise specified.

For example, the file system 131a may correspond to a subdirectory "GNS:\fsA\" in the preset root directory "GNS:\", where any path in the file system 131a corresponds to the path in the subdirectory "GNS:\fsA\". For example, it is assumed that a file path of a piece of data in the file system 131a is "fsA:\path 1". In this case, it can be learned that in the name space corresponding to the preset root directory, a file path of the data is "GNS:\fsA\path 1". For another example, it is assumed that a file path of a piece of data in the file system 131a is "fsA:\path 2". In this case, it can be learned that in the name space corresponding to the preset root directory, a file path of the data is "GNS:\fsA \path 2". The rest may be deduced by analogy.

For example, based on the foregoing design, content in the mount information table may be those shown in Table 2.

TABLE 2

| Root directory corresponding to a file system | Subdirectory in a global name space |
|---|---|
| fsA:\ | GNS:\fsA |
| fsA:\ | GNS:\fsB |
| fsA:\ | GNS:\fsC |

The column "root directory corresponding to a file system" records a root directory of each file system, and the column "subdirectory in a global name space" records a subdirectory that is in the name space corresponding to the preset root directory and that corresponds to each file system. In this way, when receiving the access request carrying the first file path, for example, the first file path is "GNS:\fsA\path 1", the routing gateway 120 may search for the subdirectory "GNS:\fsA" included in the first file path in the column "subdirectory in a global name space" in Table 1, and determine a file system corresponding to the first file path. Then, based on a path "\path 1" in the subdirectory in the first file path, the routing gateway 120 determines that a file path (that is, the second file path) in the file system corresponding to the first file path is "fsA:\path 1".

Based on the foregoing design, in a process of establishing the mount information table in S203, S203 may specifically include the following steps.

S2031: The routing gateway 120 establishes a correspondence between a first subdirectory in the name space corresponding to the preset root directory and the first file system.

Any path in the first subdirectory corresponds to a path that is in the first file system and that is the same as the path.

S2032: The routing gateway 120 records the correspondence between the first subdirectory and the first file system in the mount information table.

For example, for the three file systems in the data center 130 in FIG. 3, correspondences between subdirectories in the name space corresponding to the preset root directory and the file systems are established in a manner described in S2031 and S2032. The correspondences are recorded in a mount information table, and the mount information table shown in Table 2 may be obtained. In this way, when receiving the access request carrying the first file path, the routing gateway 120 can determine, based on the mount information table, the file path in the file system corresponding to the first file path.

In addition, as shown in FIG. 5B, the method may further include:

S204: The routing gateway 120 determines, based on the second file path, the storage address corresponding to the to-be-accessed data.

Specifically, after the second file path in the first file system corresponding to the first file path is determined by implementing 202, the storage address corresponding to the to-be-accessed data can be determined based on the second file path. Then, the read/write operation on the data can be implemented based on the storage address.

In an implementation, S204 may specifically include:

S2041: The routing gateway 120 determines a first metadata node based on the second file path.

The first metadata node may be a primary metadata node in the first file system, or a metadata node that stores metadata of data to be accessed this time in the first file system.

The first file system may include one or more metadata nodes, and each metadata node records metadata of all or a part of data in the file system. The metadata of the data specifically includes a correspondence between a storage address of the data and a file path.

For example, as shown in FIG. 3, the file system 131*a* (which may be the first file system described above) includes a metadata node 131*a*1 and a metadata node 131*a*2. The metadata node 131*a*1 and the metadata node 131*a*2 record metadata of all or a part of data in the file system 131*a*.

Specifically, in an example, the metadata node 131*a*1 and the metadata node 131*a*2 record metadata of all data in the file system 131*a*. In this case, the metadata node 131*a*1 and the metadata node 131*a*2 may be in a principal-subordinate relationship. When the data in the file system 131*a* needs to be accessed, a primary metadata node (for example, the metadata node 131*a*1) may be preferentially selected to obtain a storage address of the data. When the primary metadata node malfunctions, the storage address of the data is obtained from a secondary metadata node (for example, the metadata node 131*a*2). In this example, the first metadata node may be the metadata node 131*a*1 (that is, the primary metadata node). In another example, the metadata node 131*a*1 and the metadata node 131*a*2 record metadata of a part of the data in the file system 131*a*. When the data in the file system 131*a* needs to be accessed, a metadata node on which metadata of data to be accessed this time is located may be first determined, and then a storage address of the data is obtained from the metadata node. In this example, the first metadata node may be a metadata node that stores the metadata of the data to be accessed this time in the metadata node 131*a*1 and the metadata node 131*a*2.

In a possible design, S2041 may specifically include: The routing gateway 120 determines the first metadata node in the first file system based on the second file path and a node information set.

The node information set records node information of each metadata node in the first file system.

Specifically, node information of the metadata node may include an access address (for example, an IP address) of the metadata node, a principal-subordinate type (a primary metadata node/secondary metadata node) of the metadata node, a metadata range that is of service data and that is recorded on the metadata node (to be specific, information indicating service data with metadata recorded on the metadata node), and the like. In other words, the node information of the metadata node may specifically include various information used to determine a metadata node corresponding to a current access request. The foregoing lists only several common information types (namely, an access address of a metadata node, whether a metadata node is a primary metadata node or a secondary metadata node, and a metadata range that is of service data and that is recorded on a metadata node). A specific type of information included in the node information of the metadata node is not limited in this embodiment.

In addition, in a possible design, to enable the routing gateway 120 to determine, based on the second file path, the metadata node that is in the first file system and that corresponds to the current access, as shown in FIG. 5A, before S2041, in this embodiment, the method may further include:

S205: The routing gateway 120 obtains node information of a metadata node in each of the at least two file systems, and establishes a node information set. Specifically, the node information of the metadata node may include an access address (for example, an IP address) of the metadata node, whether the metadata node is a primary metadata node or secondary metadata node, a metadata range that is of service data and that is recorded on the metadata node (to be specific, information indicating service data with metadata recorded on the metadata node), and the like.

After the first metadata node in the first file system is determined by implementing S2041, the method further includes:

S2042: The routing gateway 120 sends an address request carrying the second file path to the first metadata node.

When receiving the address request, the first metadata node can determine the storage address of the to-be-accessed data in the first file system based on the second file path, and then feed back the storage address to the routing gateway 120. Further, the method further includes:

S2043: The routing gateway 120 receives the storage address of the to-be-accessed data sent by the first metadata node.

In addition, after the routing gateway 120 determines the storage address of the to-be-accessed data by implementing the foregoing step S204, as shown in FIG. 5B, the method may further include:

S206: The routing gateway 120 sends the storage address of the to-be-accessed data to the service cluster 110.

Specifically, when receiving the storage address of the to-be-accessed data, the service cluster 110 may access a storage node in the first file system based on the storage address of the to-be-accessed data. In this way, the read/write operation can be performed on the to-be-accessed data.

In addition, in an implementation, as shown in FIG. 5B, the method further includes:

S207: When the node information of the metadata node in the first file system changes, the routing gateway 120 generates log information, and updates the node information set.

The log information records changed content of the node information.

Specifically, on the one hand, the node information of the metadata node in the file system may change as the file system runs. For example, the access address of the metadata node changes, or the principal-subordinate type of the metadata node changes, or the metadata range that is of the service data and that is recorded on the metadata node changes. In this case, when the node information of the metadata node changes, the node information set in the routing gateway 120 needs to be updated, to ensure normal access to the data in the file system. In other words, the node information set is synchronized with the node information of the metadata node in the file system. On the other hand, a case in which the node information set fails to be synchronized while the node information of the metadata node changes may occur. For example, the node information of the metadata node changes, but the routing gateway does not update the node information set accordingly. Therefore, in this embodiment, when the node information of the metadata node in the first file system changes, the log information may be generated and the node information set may be updated. In this way, when the node information set fails to be updated, the node information set may be updated by triggering log rollback.

For example, the routing gateway 120 may periodically detect whether node information stored in the node information set is consistent with the node information of the metadata node in the file system. When it is detected that the node information stored in the node information set is inconsistent with the node information of the metadata node in the file system, log rollback is triggered to update the node information set.

In the foregoing implementation, the log information is generated when the node information of the metadata node in the first file system changes. In this case, when the node information in the node information set is inconsistent with the actual node information of the metadata node, the node information set may be updated by triggering log rollback. This improves system stability.

In the foregoing embodiment, a scenario in which the routing gateway 120 and the file systems in the data center 130 are independent of each other is used as an example to describe the information processing method provided in embodiments. The following describes a structure of a storage system in which the routing gateway 120 is located in the file system of the data center 130.

Figure 6:
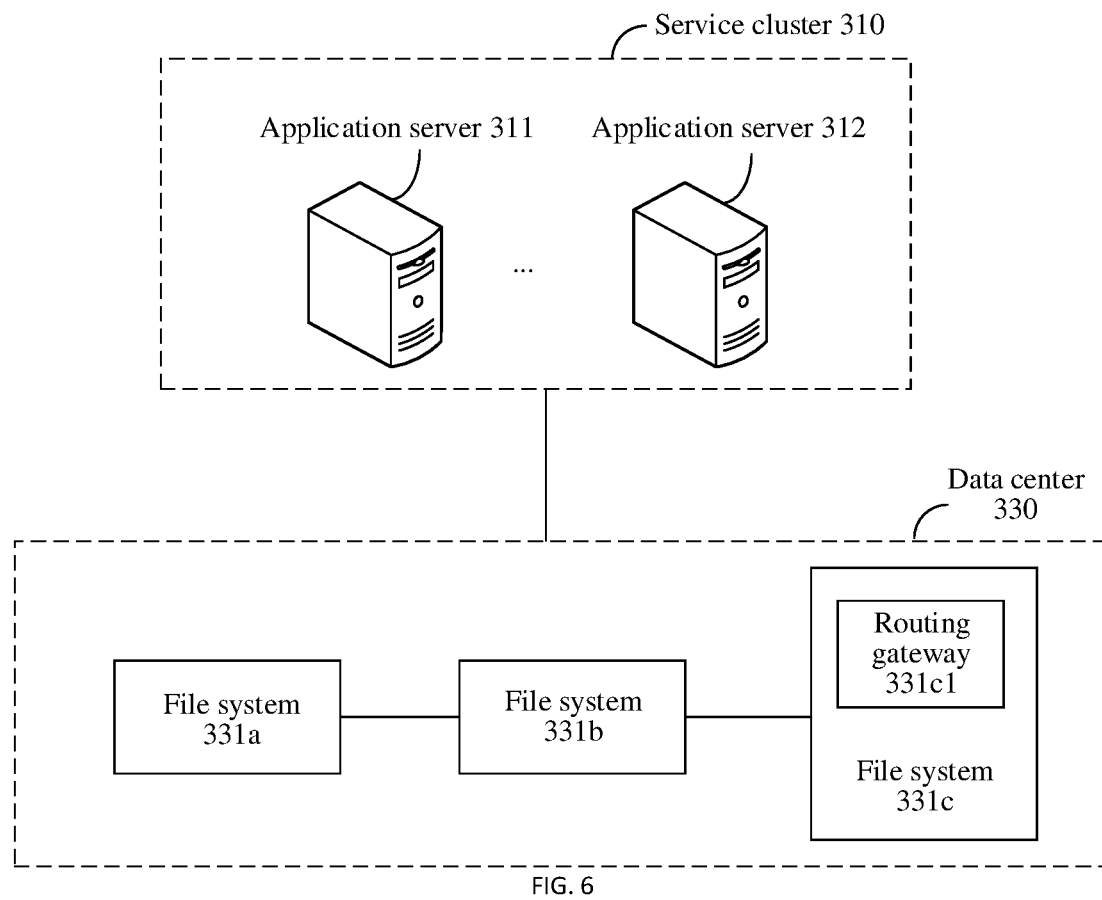
FIG. 6 is a schematic diagram 4 of an architecture of a storage system according to this application.

Specifically, in the scenario in which the routing gateway 120 is located in the file system of the data center 130, the architecture of the storage system is shown in FIG. 6.

The storage system includes a service cluster 310 configured to implement a service function and a data center 330 configured to store data. The service cluster 310 may include one or more application servers. For example, the service cluster 310 in FIG. 6 includes the application server 311 and the application server 312. For functions and working processes of the service cluster 310 and one or more application servers in the service cluster 310, refer to the foregoing related descriptions of the service cluster 110. Details are not described herein again.

In addition, the data center 330 includes a plurality of file systems configured to manage different physical storage resources. As shown in FIG. 6, the data center 330 includes a file system 331*a*, a file system 331*b*, and a file system 331*c*. The file system 331*a*, the file system 331*b*, and the file system 331*c* may communicate with each other. A specific communication manner is not limited in this embodiment.

The file system 331*c* includes a routing gateway 33101. Specifically, when the service cluster 310 needs to access the data center 330 to perform a data read/write operation, the service cluster 310 sends, to the routing gateway 331*c*1 in the file system 331*c*, an access request carrying a file path including a preset root directory. When receiving the access request, the routing gateway 331C1 may obtain a storage address of to-be-accessed data according to the information processing method in FIG. 5A and FIG. 5B. Then, the routing gateway sends the storage address to the service cluster 310, so that the service cluster 310 can access the storage address. In this way, the read/write operation can be completed. A specific function of the routing gateway 331*c*1 may be implemented by some or all hardware components of one or more storage devices in the file system.

Further, except descriptions of a part related to the routing gateway 331*a*1, for a structure and a function of each file system included in the data center 330, refer to the foregoing descriptions of each file system in the data center 130. Details are not described herein again.

The following describes a running process of the storage system shown in FIG. 6.

For example, when the file system 331*c* is not obtained through capability expansion in the data center 330, in other words, the data center 330 includes only the file system 331*a* and the file system 331*b*, the service cluster 310 may access the file system 331*a* and the file system 331*b* by using a related technology. For example, the service cluster 310 may separately send file paths in the file system 331*a* and the file system 331*b* to the file system 331*a* and the file system 331*b* through communication interfaces corresponding to the file system 331*a* and the file system 331*b*, to access data in the file systems.

Then, the file system 331*c* may be added to the data center 330 in the following manner described in S401 to S404.

S401: Install and deploy a hardware device corresponding to the file system 331*c*, and create a name space of the file system 331C.

S402: On a side of the service cluster 310, add a service allocated to the file system 331*c*.

S403: Configure the routing gateway 33101 in the file system 331*c*, and establish a mount information table.

The mount information table includes correspondences between the file paths in the file system 331*a* and the file system 331*b* and file paths in the name space of the file system 331C.

For example, the file paths in the file system 331*a* and the file system 331*b* are respectively mapped to subdirectories in a root directory of the file system 331*c* (that is, a name space of the file system 331*c*).

S404: Configure routing policies of the file system 331*a* and the file system 331*b* to be a forwarding mode, so that the file system 331*a* and the file system 331*b* can forward all access requests received from the service cluster 310 to the file system 331*c*, specifically, to the routing gateway 3311 in the file system 331*c*.

After the file system 331c is added to the data center 330 in the foregoing manner, an access request carrying a file path in the name space of the file system 331c may be sent by using the service cluster 310. Then the routing gateway 33101 determines the storage address of the to-be-accessed data (the storage address may be a storage address in the file system 331a, the file system 331b, or the file system 331c) according to the method shown in FIG. 5A and FIG. 5B, and feeds back the storage address to the service cluster 310, so that the service cluster 310 can complete the read/write operation.

In addition, this embodiment provides an information processing apparatus. The information processing apparatus may perform some or all of the steps in embodiments. For example, the information processing apparatus can perform the steps performed by the routing gateway in the foregoing method. These steps or operations are merely examples. The information processing apparatus in this embodiment may further perform other operations or perform variations of some or all of the foregoing steps. In addition, the steps may be performed in a sequence different from the sequence presented in embodiments of this application, and not all the operations in embodiments of this application may be performed.

It may be understood that, to implement functions in the foregoing embodiments, the information processing apparatus includes a corresponding hardware structure and/or software module for performing each function. A person skilled in the art should be easily aware that, with reference with modules and method steps in the examples described in embodiments disclosed in this application, this application can be implemented by hardware or a combination of hardware and computer software. Whether a function is performed by using hardware or computer software driving hardware depends on particular application scenarios and design constraints of the technical solutions.

Figure 7:
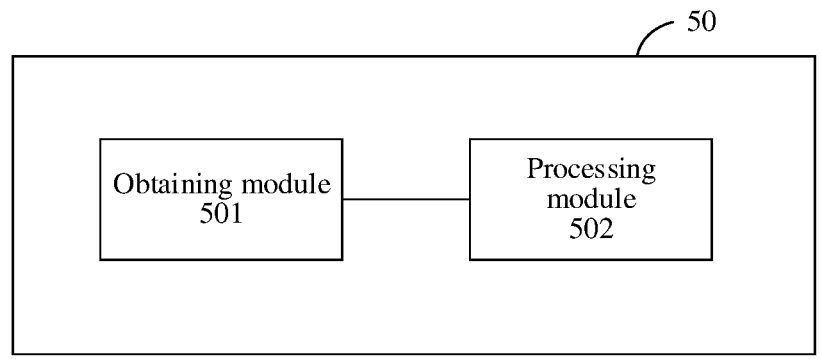
FIG. 7 is a schematic diagram 1 of a structure of an information processing apparatus according to this application.

FIG. 7 is a schematic diagram of a structure of an information processing apparatus according to this embodiment. The information processing apparatus may be configured to implement functions of some or all steps in the foregoing method embodiments, and therefore can implement beneficial effects of the foregoing method embodiments. For example, in this embodiment, the information processing apparatus may include a routing device. For another example, when a function of the routing gateway is integrated into a file system, the information processing apparatus may further include some or all hardware components in a storage device in the file system.

As shown in FIG. 7, an information processing apparatus 50 includes one or more of an obtaining module 501 and a processing unit 502. The information processing apparatus 50 is configured to implement functions of one or more steps in the method embodiment corresponding to FIG. 5A and FIG. 5B.

For example, when the information processing apparatus 50 is configured to implement the method shown in FIG. 5A and FIG. 5B, the obtaining module 501 is configured to perform S201. The processing module 502 is configured to perform one or more of S202 to S207.

For more detailed descriptions of the obtaining module 501 and the processing module 502, refer to related descriptions in the method embodiment corresponding to FIG. 5A and FIG. 5B. Details are not described herein again.

Figure 8:
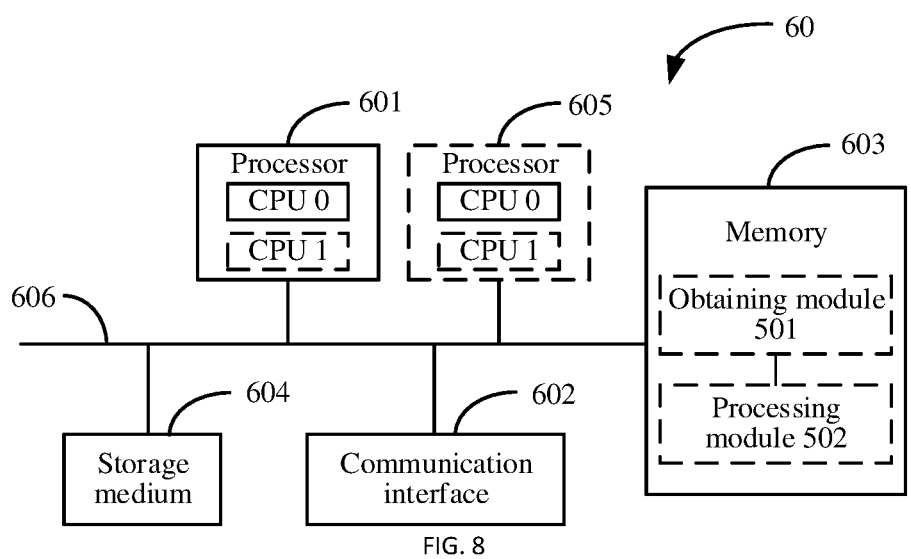
FIG. 8 is a schematic diagram 2 of a structure of an information processing apparatus according to this application.

FIG. 8 is a schematic diagram of a structure of another information processing apparatus according to this embodiment. An information processing apparatus 60 may be a chip or a system on chip. The information processing apparatus 60 may include a processor 601, a communication line 606, a memory 603, and some or all components of at least one communication interface 602.

The processor 601 is configured to execute the information processing method provided in the embodiment.

Specifically, the processor 601 may include a general-purpose central processing unit (CPU), and the processor 601 may further include a microprocessor, a field programmable gate array (Field Programmable Gate Array, FPGA), a digital signal processor (DSP) or an application-specific integrated circuit (ASIC), another programmable logic device, discrete gate or transistor logic device, discrete hardware component, or the like.

In specific implementation, in an embodiment, the processor 601 may include one or more CPUs, for example, a CPU 0 and a CPU 1 in FIG. 8.

In specific implementation, in an embodiment, the apparatus 60 may include a plurality of processors, for example, a processor 601 and a processor 605 in FIG. 8. Each of the processors may be a single-core (single-CPU) processor, or may be a multi-core (multi-CPU) processor. The processor herein may be one or more devices, circuits, and/or processing cores configured to process, for example, data (a computer program instruction).

In addition, the memory 603 may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (SDRAM), a synchlink dynamic random access memory (SLDRAM), and a direct rambus random access memory (DR RAM). The memory 603 may exist independently, and is connected to the processor 601 by the communication line 606. Alternatively, the memory 603 may be integrated with the processor 601.

The memory 603 stores computer instructions. As shown in FIG. 8, the computer instructions stored in the memory 603 may include a software module configured to implement functions of the obtaining module 501 and the processing module 502. The processor 601 may execute the computer instructions stored in the memory 603, to perform the information processing method provided in the embodiment.

Optionally, the computer-executable instructions in this embodiment may also be referred to as application code, which is not specifically limited in this embodiment.

In addition, the communication interface 602 may also be referred to as an interface. The communication interface 602 uses any apparatus like a transceiver, and is configured to communicate with another device or a communication network like the Ethernet, a radio access network (RAN), or a wireless local area network (WLAN).

In addition, the communication line 606 is configured to connect components in the information processing apparatus 60. Specifically, the communication line 606 may include a data bus, a power bus, a control bus, a status signal bus, and the like. However, for clear description, various buses are marked as the communication line 606 in the figure.

In specific implementation, in an embodiment, the information processing apparatus 60 may further include a storage medium 604. The storage medium 604 is configured to store computer instructions and various data for implementing the technical solutions of embodiments. Therefore, when performing the foregoing information processing method in embodiments, the information processing apparatus 60 loads the computer instructions and various data that are stored in the storage medium 604 to the memory 603, so that the processor 601 can execute the computer instructions stored in the memory 603 to perform the information processing method provided in the embodiment.

It should be understood that the information processing apparatus 60 according to this embodiment may correspond to the information processing apparatus 50 in the embodiment, and may correspond to a corresponding body for executing the information processing method according to the embodiment. In addition, the foregoing and other operations and/or functions of the modules in the information processing apparatus 60 are respectively used to implement corresponding procedures of the method in FIG. 5A and FIG. 5B. For brevity, details are not described herein again.

In a possible embodiment, this embodiment further provides a file storage system, where the file storage system includes a routing gateway and a storage node. The routing gateway is configured to perform some or all steps in the foregoing method embodiment, and the storage node is configured to store data required for implementing a service. For example, the file storage system may be the file system 331c in FIG. 6.

The method steps in the embodiment of this application may be implemented by hardware, or may be implemented by a processor executing software instructions. The software instructions include corresponding software modules. The software module may be stored in a RAM, a flash memory, a ROM, a PROM, an EPROM, an EEPROM, a register, a hard disk drive, a removable hard disk, a CD-ROM, or a storage medium of any other form known in the art. For example, a storage medium is coupled to a processor, so that the processor can read information from the storage medium and write information into the storage medium. The storage medium may be a component of the processor. The processor and the storage medium may be disposed in an ASIC. In addition, the ASIC may be located in a network device or a terminal device. The processor and the storage medium may alternatively exist as discrete components in the network device or the terminal device.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs and instructions. When the computer programs or instructions are loaded and executed on a computer, the procedures or functions in embodiments are completely or partially executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium that can be accessed by a computer, or a data storage device, for example, a server or a data center, integrating one or more usable media. The usable medium may be a magnetic medium, for example, a floppy disk, a hard disk drive, or a magnetic tape; or may be an optical medium, for example, a digital video disc (DVD); or may be a semiconductor medium, for example, an SSD.

In embodiments, unless otherwise specified or a logical conflict occurs, terms and/or descriptions in different implementations are consistent and may be mutually referenced, and technical features in different embodiments may be combined to form a new embodiment based on an internal logical relationship.

In embodiments, "at least one" refers to one or more, "a plurality of" refers to two or more, and other quantifiers are similar to the foregoing case. The term "and/or" describes an association relationship between associated objects and indicates that three relationships may exist. For example, A and/or B may indicate the following three cases: Only A exists, both A and B exist, and only B exists. In addition, an element that appears in singular forms "a", "an", and "the" does not mean "one or only one" unless otherwise specified in the context, but means "one or more". For example, "a device" means one or more such devices. Furthermore, "at least one of . . . " means one or any combination of subsequent associated objects. For example, "at least one of A, B, and C" includes A, B, C, AB, AC, BC, or ABC. In the descriptions of embodiments, the character "/" usually indicates that the associated objects are in an "or" relationship. In a formula of embodiments, the character "/" indicates that the associated objects are in a "division" relationship.

It may be understood that various numbers in embodiments are merely used for differentiation for ease of description, and are not used to limit the scope of embodiments. The sequence numbers of the foregoing processes do not mean execution sequences. The execution sequences of the processes should be determined based on functions and internal logic of the processes.

What is claimed is:

1. A method, comprising:
    receiving, from a server, an access request, wherein the access request carries a first file path corresponding to to-be-accessed data, and the first file path comprises a preset root directory;
    determining, based on a path of the first file path in the preset root directory, a second file path in a first file system corresponding to the first file path, wherein a name space corresponding to the preset root directory comprises at least two types of sub-paths, and the at least two types of sub-paths respectively correspond to file paths in at least two different file systems;
    determining a storage address of the to-be-accessed data based on the second file path; and
    transmitting the storage address to the server, wherein the storage address is configured to be used by the server to access data from one of the at least two different file systems corresponding to the first file path.

2. The method according to claim 1, wherein determining, based on the path of the first file path in the preset root directory, the second file path in the first file system corresponding to the first file path comprises:
    determining the second file path of the to-be-accessed data in the first file system based on the path of the first file path in the preset root directory and a mount information table, wherein a correspondence between a file path in the name space corresponding to the preset root directory and a file path in a corresponding file system is recorded in the mount information table.

3. The method according to claim 2, further comprising:
establishing a correspondence between a first subdirectory in the name space corresponding to the preset root directory and the first file system, wherein any path in the first subdirectory corresponds to a path in the first file system; and
recording the correspondence between the first subdirectory and the first file system in the mount information table.

4. The method according to claim 1, wherein determining the storage address of the to-be-accessed data based on the second file path comprises:
determining a first metadata node based on the second file path;
sending an address request carrying the second file path to the first metadata node; and
receiving the storage address that corresponds to the to-be-accessed data and that is sent by the first metadata node.

5. The method according to claim 4, further comprising:
in response to node information of a metadata node in the first file system being changed, generating log information and updating a node information set, wherein the log information records changed content of the node information.

6. The method according to claim 1, wherein the at least two different file systems comprise at least two file systems of different types.

7. An apparatus, comprising:
at least one processor; and
a memory with instructions stored thereon, wherein the instructions, when executed by the at least one processor, enable the apparatus to perform:
receiving, from a server, an access request, wherein the access request carries a first file path corresponding to to-be-accessed data, and the first file path comprises a preset root directory;
determining, based on a path of the first file path in the preset root directory, a second file path in a first file system corresponding to the first file path, wherein a name space corresponding to the preset root directory comprises at least two types of sub-paths, and the at least two types of sub-paths respectively correspond to file paths in at least two different file systems;
determining a storage address of the to-be-accessed data based on the second file path; and
transmitting the storage address to the server, wherein the storage address is configured to be used by the server to access data from one of the at least two different file systems corresponding to the first file path.

8. The apparatus according to claim 7, wherein determining, based on the path of the first file path in the preset root directory, the second file path in the first file system corresponding to the first file path comprises:
determining the second file path of the to-be-accessed data in the first file system based on the path of the first file path in the preset root directory and a mount information table, wherein a correspondence between a file path in the name space corresponding to the preset root directory and a file path in a corresponding file system is recorded in the mount information table.

9. The apparatus according to claim 8, wherein the instructions, when executed by the at least one processor, further enable the apparatus to perform:
establishing a correspondence between a first subdirectory in the name space corresponding to the preset root directory and the first file system, wherein any path in the first subdirectory corresponds to a path in the first file system; and
recording the correspondence between the first subdirectory and the first file system in the mount information table.

10. The apparatus according to claim 7, wherein determining the storage address of the to-be-accessed data based on the second file path comprises:
determining a first metadata node based on the second file path;
sending an address request carrying the second file path to the first metadata node; and
receiving the storage address that corresponds to the to-be-accessed data and that is sent by the first metadata node.

11. The apparatus according to claim 10, wherein the instructions, when executed by the at least one processor, further enable the apparatus to perform:
in response to node information of a metadata node in the first file system being changed, generating log information and updating a node information set, wherein the log information records changed content of the node information.

12. The apparatus according to claim 11, wherein the at least two different file systems comprise at least two file systems of different types.

13. A file storage system including a storage node and a routing device, wherein the routing device comprises the apparatus of claim 7.

14. A non-transitory computer readable medium with instructions stored thereon, wherein the instructions, when executed by a processor, enable the processor to perform:
receiving, from a server, an access request, wherein the access request carries a first file path corresponding to to-be-accessed data, and the first file path comprises a preset root directory;
determining, based on a path of the first file path in the preset root directory, a second file path in a first file system corresponding to the first file path, wherein a name space corresponding to the preset root directory comprises at least two types of sub-paths, and the at least two types of sub-paths respectively correspond to file paths in at least two different file systems;
determining a storage address of the to-be-accessed data based on the second file path; and
transmitting the storage address to the server, wherein the storage address is configured to be used by the server to access data from one of the at least two different file systems corresponding to the first file path.

15. The non-transitory computer readable medium according to claim 14, wherein determining, based on the path of the first file path in the preset root directory, the second file path in the first file system corresponding to the first file path comprises:

determining the second file path of the to-be-accessed data in the first file system based on the path of the first file path in the preset root directory and a mount information table, wherein a correspondence between a file path in the name space corresponding to the preset root directory and a file path in a corresponding file system is recorded in the mount information table.

16. The non-transitory computer readable medium according to claim 15, wherein the instructions, when executed by the processor, further enable the processor to perform:

establishing a correspondence between a first subdirectory in the name space corresponding to the preset root directory and the first file system, wherein any path in the first subdirectory corresponds to a path in the first file system; and recording the correspondence between the first subdirectory and the first file system in the mount information table.

17. The non-transitory computer readable medium according to claim 14, wherein determining the storage address of the to-be-accessed data based on the second file path comprises:

determining a first metadata node based on the second file path;

sending an address request carrying the second file path to the first metadata node; and receiving the storage address that corresponds to the to-be-accessed data and that is sent by the first metadata node.

18. The non-transitory computer readable medium according to claim 17, wherein the instructions, when executed by the processor, further enable the processor to perform:

in response to node information of a metadata node in the first file system being changed, generating log information and updating a node information set, wherein the log information records changed content of the node information.

19. The non-transitory computer readable medium according to claim 18, wherein the at least two different file systems comprise at least two file systems of different types.

* * * * *